United States Patent [19]

Sogabe et al.

[11] Patent Number: 4,691,135

[45] Date of Patent: Sep. 1, 1987

[54] ROTARY DRIVING DEVICE USED FOR ROTARY ACTUATOR

[75] Inventors: Ichita Sogabe, Gifu; Syuuji Murata, Nagoya; Yuji Yokoya, Toyota, all of Japan

[73] Assignees: Nippondenso Co., Ltd., Kariya; Toyota Jidosha Kabushiki Kaisha, Toyota, both of Japan

[21] Appl. No.: 799,656

[22] Filed: Nov. 19, 1985

[30] Foreign Application Priority Data

Nov. 20, 1984 [JP] Japan ............................... 59-246429

[51] Int. Cl.[4] ............................................ H02K 33/00

[52] U.S. Cl. ............................... 310/254; 251/129.11; 335/272

[58] Field of Search ...................... 251/129.09, 129.11, 251/129.12; 310/36, 49 R, 68 B, 162, 171, 254; 335/222, 272, 276

[56] References Cited

U.S. PATENT DOCUMENTS 2,718,614 9/1955 Gamble .............................. 335/229
2,767,357 10/1956 Naybor .............................. 335/272
4,577,832 3/1986 Sogabe .......................... 251/129.11

FOREIGN PATENT DOCUMENTS 59-144357 8/1984 Japan .

OTHER PUBLICATIONS

U.S. patent application Ser. No. 704031, "Rotary Driving Apparatus", filed on Feb. 21, 1985.

*Primary Examiner*—Patrick R. Salce
*Assistant Examiner*—D. Rebsch
*Attorney, Agent, or Firm*—Cushman, Darby & Cushman

[57] ABSTRACT

A rotary driving device includes a pair of stator magnetic poles having opposing end faces separated by gaps; a rotor of magnetic material rotatably supported inside the stator magnetic pole pair, having two pole surfaces between two planes parallel with the axis of rotation; and an excitation coil of the stator magnetic pole pair. The angular positions of the gaps between the end faces of the stator magnetic pole pair along the circumferential direction are changed along the axial direction, so that output and detent torques are obtained effectively and satisfactorily.

8 Claims, 10 Drawing Figures

ROTARY DRIVING DEVICE USED FOR ROTARY ACTUATOR

BACKGROUND OF THE INVENTION

1. Field of the Invention

The present invention relates to a rotary driving device used for a rotary actuator. The rotary driving device according to the present invention is used as an actuator for driving, e.g., a rotary valve.

2. Description of the Related Art

A conventional rotary driving device is, for example, constituted by stator magnetic poles, fixed in a housing, and a rotor of a permanent magnet rotatably supported by a shaft inside the magnetic poles. The polarities of the stator magnetic poles are reversed by an excitation coil, thereby rotating the rotor. The rotor has a cylindrical shape, and the respective stator magnetic poles are arranged on an identical circumference so that distances between inner end faces of the stator magnetic poles and a center of rotation of the rotor become the same. For this reason, lines of magnetic force from the rotor are distributed to be wider than an outer periphery thereof, and a magnetic attractive force between the stator magnetic poles and the rotor is weakened.

Therefore, when external rotation or vibration is applied to the excitation coil in a nonconductive state, the rotor is easily rotated and cannot maintain a stable rest position. In particular, when a rotary driving device of this type is compactly formed, i.e., into a shallow outer shape, the outer diameter of the rotor is decreased. Therefore, when the excitation coil is rendered nonconductive, the rest torque of the rotor becomes small and a stable rest position cannot be maintained. In addition, when the excitation coil is energized, only a small output torque can be obtained from the rotor, for the same reason as described above.

SUMMARY OF THE INVENTION

The present invention has been made in consideration of the above situation, and has as its object to provide a compact, improved rotary driving device which can effectively generate an output torque and a detent torque.

According to the fundamental aspect of the present invention, there is provided a rotary driving device including: a case defining an outer shape of the rotary driving device; a pair of stator magnetic poles fixed inside the case and having end portions opposing through gaps; a rotor of magnetic material rotatably supported inside the stator magnetic pole pair and having two pole surfaces between two planes parallel with the axis or rotation; a rotary shaft for rotatably supporting the rotor; and an excitation coil for generating a magnetic force between the stator magnetic pole pair and the rotor; the positions of the gaps between the end portions of the stator magnetic pole pair along the circumferential direction being changed along the axial direction.

According to another aspect of the present invention, there is provided a rotary driving a device including: a case defining an outer shape of the rotary driving device; a rotor of magnetic material rotatably supported in the case and having at least one pole surface between two planes parallel with the axis of rotation; a shaft for rotatably supporting the rotor; a pair of stator magnetic poles arranged outside rotor, fixed inside the case, and having end portions opposing each other with a gap, the position where an attractive magnetic force or a repulsive magnetic force between the end portion of the stator magnetic pole and the end portion of the rotor is generated being changed according to the rotation of the rotor; and an excitation coil for generating a magnetic force between the stator magnetic pole pair and the rotor.

With the above arrangement, when the excitation coil is energized and the rotor is rotated, the rotor receives an attractive or repulsive force from an end portion or inner surface of the nearest stator magnetic pole in accordance with a rotational angle. Thus, the rotor is stable at any rotational angle, and a large rotational torque can be obtained.

Since the two pole surfaces of the rotor abut against the stator magnetic pole and an upper or lower portion of the rotor opposes an inner surface of the stator magnetic pole, a large detent torque can be obtained.

BRIEF DESCRIPTION OF THE DRAWINGS

FIGS. 7 and 8 are graphs showing characteristics of the device shown in FIG. 2, respectively.

DETAILED DESCRIPTION OF THE PREFERRED EMBODIMENT

Figure 1A:
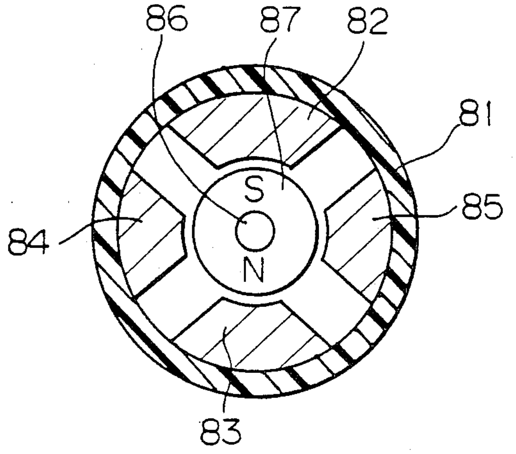
Fig. 1A (PRIOR ART)
FIGS. 1A and 1B are views showing an example of a prior art rotary driving device.
Figure 1B:
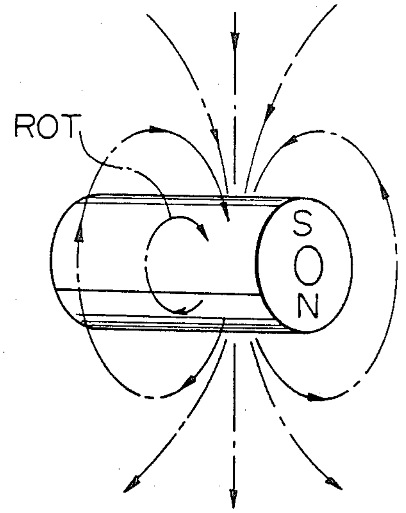
Fig. 1B (PRIOR ART)

Before entering into the description of the preferred embodiment, an example of a prior art rotary driving device for a rotary actuator will be described with reference to FIGS. 1A and 1B. As shown in FIGS. 1A and 1B, a rotary driving device is constituted by stator magnetic poles 82, 83, 84, and 85 fixed in a housing 81 and a rotor 87 as a permanent magnet rotatably supported by a shaft 86 inside the magnetic poles. The polarities of the stator magnetic poles 82 and 83 or 84 or 85 are reversed by an excitation coil, thereby rotating the rotor 87.

In the device shown in FIGS. 1A and 1B, the rotor 87 has a cylindrical shape, and the respective stator magnetic poles are arranged on an identical circumference so that distances between inner end faces of the stator magnetic poles 82, 83, 84, and 85 and a rotating center of the rotor 87 are the same. For this reason, lines of magnetic force from the rotor 87 are distributed to be wider than the outer periphery of the rotor, as shown in FIG. 1B, and the magnetic attractive force between the stator magnetic poles 82, 83, 84, and 85 and the rotor 87 is weakened. When external rotation or vibration is applied to the excitation coil in a nonconductive state, the rotor is easily rotated and cannot maintain a stable rest position.

Figure 2:
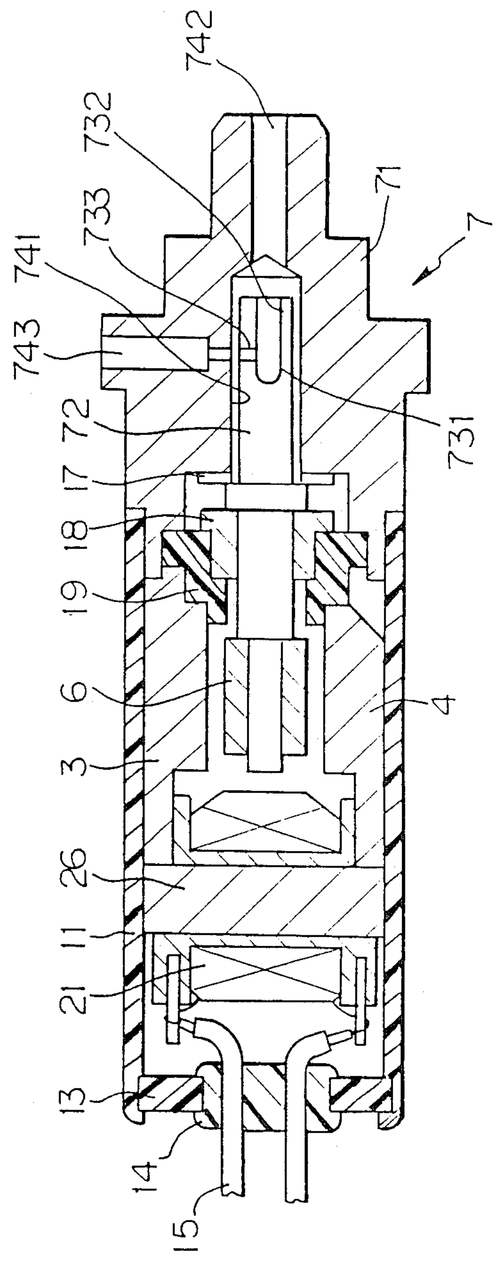
FIG. 2 is a sectional view showing a rotary driving device according to an embodiment of the present invention.
Figure 3:
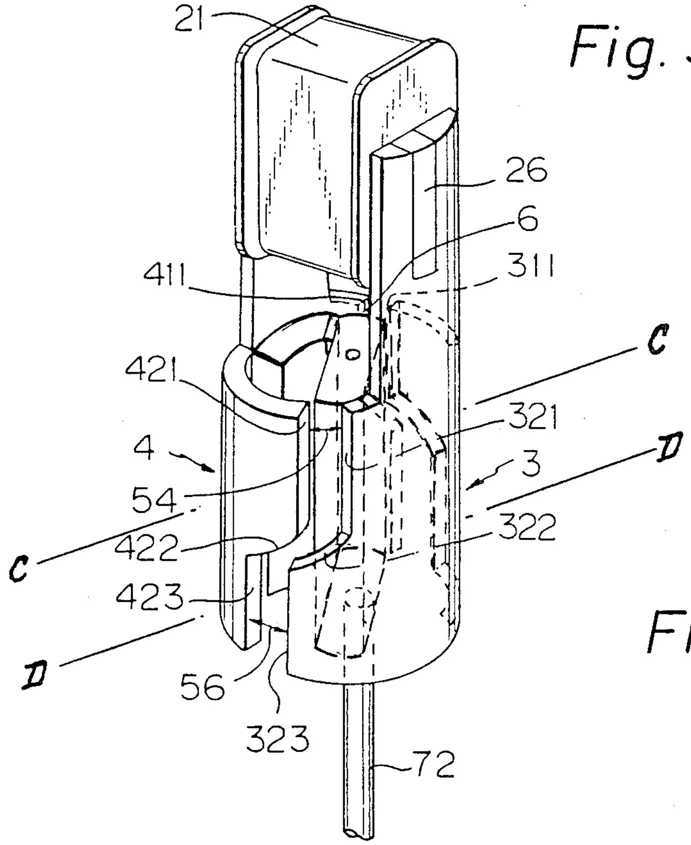
FIG. 3 is a perspective view showing an important part of the device shown in FIG. 2.
Figure 4:
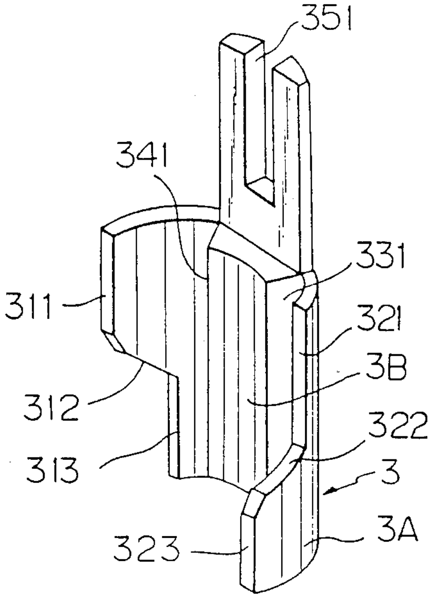
FIG. 4 is a perspective view showing an important part of the device shown in FIG. 3.

A rotary driving device according to an embodiment of the present invention is shown in FIGS. 2, 3, and 4. The rotary driving device shown in FIGS. 2, 3, and 4 is used as a torque motor for switching valves.

Reference numeral 11 denotes a cylindrical case which comprises a nonmagnetic member and stores components of the rotary driving device to be described later in detail. The case 11 is coupled to a housing 71 of a valve portion 7, and a selector valve is housed in the housing 71.

In the valve portion 7, an output shaft 72 which rotates together with a rotor 6 as the rotor is supported by a bearing 18 fixed to the housing 71. Reference numeral 19 denotes a plate which comprises a nonmagnetic member and fixes the bearing 18 to the housing 71; and 17, a thrust washer of the output shaft 72 fixed thereto. The output shaft 72 also serves as a valve needle 731, i.e., as a component of the valve portion, and a valve port 732 provided in the axial direction and a valve port 733 communicating with the valve port 732 and open to the outer periphery of the valve needle 731 are provided in the valve needle 731. The valve needle 731 is inserted in a hole 741 of the housing 71. The housing 71 is provided with input and output ports 742 and 743 for a fluid, thus forming a rotor valve which switches the fluid by rotation of the output shaft 72. When the valve needle 731 is located at a position shown in FIG. 2, the input port 742, the valve ports 732 and 733, and the output port 743 communicate with each other, and open the valve. However, when the valve needle 731 is rotated from this position, communication between the valve port 733 and the output port 743 is interrupted, thus closing the valve.

FIG. 3 is perspective view of the main part of the rotary driving device. Reference numeral 21 denotes an excitation coil; 3 and 4, a pair of stator magnetic poles fixed to an inner portion of the case 11 and having substantially an arc shape; and 6, a rotor comprising a permanent magnet which is magnetized in a radial direction so that one side of a magnetized end face exhibits the N pole and the other side exhibits the S pole. It should be noted that a central portion of the rotor 6 need not be flat. Inner surfaces of the stator magnetic pole 3 and 4 and an outer peripheral end face of the rotor 6 are arranged to be separated at a constant distance.

A yoke 26 transmits an excitation magnetic flux of the excitation coil 21 to the stator magnetic poles 3 and 4.

The stator magnetic pole 3 has a substantially arced shape constituted by an arc portion 3A with end faces 311, 312, 313, 314, 321, 322, and 323, and a contact portion 3B with contact surfaces 331 and 341. The end faces 311, 313, 321, 323, 331, and 341 are parallel to the axis of rotation of the rotor 6. The end face 312 between the end faces 311 and 313 and the end face 322 between the end faces 321 and 323 are inclined with respect to the axis of rotation. Positions of the end faces 311, 312, 313, 321, 322, and 323 in the circumferential direction are deviated along the axial direction. A deviation amount is substantially equal to a rotational range $\theta$ of the rotor 6. The shape of the intermediate end faces 312 and 322 can be referred to as a helical shape with respect to the axis of rotation.

On the other hand, the contact end faces 331 and 341 of the stator magnetic pole 3 abut against a portion of flat surfaces 61 and 62 of the rotor 6, thereby limiting rotation of the rotor and obtaining a large detent torque. The rotor 6 abuts against the end faces 331 and 441 through nonmagnetic members 331*a* and 441*a* of, e.g., a rubber or resin, provided thereto and is stopped.

The stator magnetic pole 4 also has opposing end faces 411, 412, 413, 422, and 423 and contact end faces 431 and 441 as in the magnetic pole 3, and are arranged symmetrical with the axis of rotation. The lengths (g) of gaps 51, 52, 53, 54, 55, and 56 of the opposing end faces of the stator magnetic poles 3 and 4 are set to be equal to each other. A distance between the surfaces 61 and 62 of the rotor 6, i.e., a height (h) of the rotor 6, is set to be larger than the gap length (g).

Figure 5A:
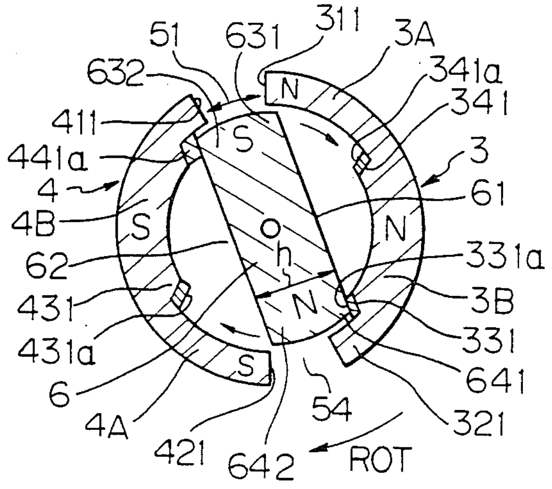
FIGS. 5A and 5B are sectional views taken respectively along the lines C—C and D—D in FIG. 3 at the stage when the rotor is at the limit of its counterclockwise rotation and is able to rotate in a clockwise direction.
Figure 5B:
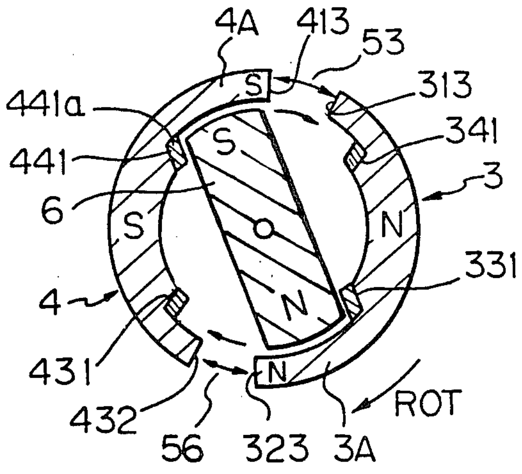
Figure 6A:
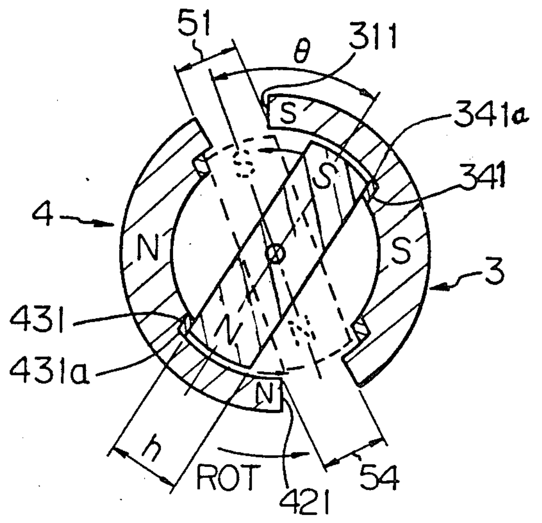
FIGS. 6A and 6B are sectional views taken respectively along lines C—C and D—D in FIG. 3 at the stage when the rotor is at the limit of its clockwise rotation and is able to rotate in a counterclockwise direction.
Figure 6B:
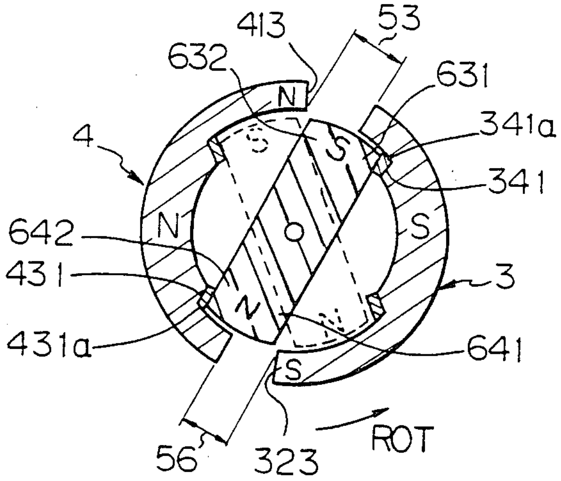

The relative positional relationship between the stator magnetic poles 3 and 4 and the rotatonal position of the rotor 6 is illustrated in FIGS. 5 and 6. At a counterclockwise rotation limit position of the rotor 6 (FIGS. 5A and 5B), the rotor 6 abuts against the contact end faces 441 and 331 of the stator magnetic poles 3 and 4 through the nonmagnetic members 441*a* and 331*a*. At a clockwise rotation limit position of the rotor 6 (FIGS. 6A and 6B), the rotor 6 abuts against the contact end faces 341 and 431 of the stator magnetic poles 3 and 4 through nonmagnetic members 341*a* and 431*a*.

First, a case will be described wherein the rotor is at the counterclockwise rotation limit position.

Referring to FIG. 5A, an edge portion 631 of the rotor 6 opposes a portion near the opposing end face 311 of the arc portion 3A of the stator magnetic pole 3, and an edge portion 642 opposes a portion near the opposing end face 421 of the arc portion 4A of the stator magnetic pole 4. For this reason, in the conductive state, a rotational torque can be obtained between the stator magnetic poles 3 and 4.

Referring to FIG. 5B, the two edge portions 631 and 632 at one end of the rotor 6 and two edge portions 641 and 642 at the other end thereof oppose inner surfaces of the arc portions 4A and 3A of the stator magnetic poles 3 and 4.

A case will be described wherein the rotor is at the clockwise rotation limit position.

Referring to FIG. 6A, the two edge portions 631 and 632 at one end of the rotor 6 and the two edge portions 641 and 642 at the other end thereof oppose inner surfaces of the arc portions 3A and 4A of the stator magnetic poles 3 and 4.

Referring to FIG. 6B, the edge portion 632 at one end of the rotor 6 opposes a portion near the end face 413 of the stator magnetic pole 4, and the edge portion 641 at the other end thereof opposes a portion near the end face 323 of the stator magnetic pole 3. For this reason, in the conductive state, a rotational torque can be obtained between the stator magnetic poles 3 and 4 and the rotor 6.

As described above, at the positions of FIGS. 5A and 5B, the detent torque and the output torque are together generated by upper and lower portions of the rotor 6.

The operation of the device shown in FIGS. 2 and 3 will be described with reference to FIGS. 5 and 6.

A magnetic flux ($\phi_1$) as a part of a rest torque at the positions of FIGS. 5A and 5B forms, due to a magnetic flux generated from the rotor comprising the permanent magnet, a closed loop as follows: the edge portion 632 of the rotor 6→the stator magnetic pole 4→the yoke 26→the stator magnetic pole 3→the edge portion 641 of the rotor 6. As shown in FIG. 5B, in the lower portion of the rotor 6, a magnetic flux ($\phi_2$) is present to form a closed loop as follows: the edge portions 631 and 632 of the rotor 6→the arc portion 4A of the stator magnetic pole 4→the yoke 26→the arc portion 3A of the stator magnetic pole 3→the edge portions 642 and 641 of the rotor 6. The rotor 6 can generate a large detent torque by these magnetic fluxes ($\phi_1$, $\phi_2$). In this case, the detent torque becomes weak with only the magnetic flux ($\phi_1$) at the upper portion of the rotor shown in FIG. 5A, and a magnetic balance is lost due to variations in size and the like. Therefore, the rotor may be shifted from the position shown in FIG. 5A to the position shown in FIG. 6A. However, the detent torque which can satisfactorily hold the rotor 6 can be obtained by the magnetic flux ($\phi_2$) at the lower portion (FIG. 6B) of the rotor 6 due to the shapes of the stator magnetic poles 3 and 4.

The operation for generating a rotational force for rotating the rotor 6 from the rest position shown in FIGS. 5A and 5B to the position of FIGS. 6A and 6B by energizing the excitation coil 21 will be described.

When the stator magnetic poles 4 and 3 are respectively magnetized to the S and N poles, a repulsive force F(1) is applied to the rotor 6 near the end faces 411, 413, 321, and 323 of the stator magnetic poles, and an attractive force F(2) is applied to the rotor 6 near the end faces 421 and 323 of the stator magnetic pole. Thus, the rotor 6 is rotated to the position of FIGS. 6A and 6B. At the same time, the rotor 6 causes the output shaft 72 to generate the output torque. The rotating force at this time obtains an activation torque by the upper portion of the rotor (FIG. 5A). This is because, at the position of FIG. 5A, the end faces 421 and 311 of the stator magnetic poles oppose the edge portions 642 and 641 of the rotor 6. In view of this, a change in magnetic energy W with respect to the rotational angle $\theta$ of the rotor 6 is large, and the attraction force F(2) is expressed by the following relation, thus obtaining a large activation torque:

$$F(2)=dW/d\theta(kg)$$

Meanwhile, since a change in magnetic energy W with respect to the rotational angle $\theta$ is small at the lower portion of the rotor (FIG. 5B), the lower portion of the rotor does not contribute much to generation of the output torque.

Note that when the gaps between the stator magnetic poles 3 and 4 are helically arranged with respect to the axis of rotation, the output torque can be increased within the overall rotational angle $\theta$ of the rotor 6.

The detent torque and the activation torque at the position in FIGS. 5A and 6B are also determined by the stator magnetic poles 3 and 4 and the rotor 6 as those at the position in FIGS. 6A and 6B.

At the position of FIGS. 6A and 6B, the magnetic flux from the rotor 6 is divided at the lower portion of the rotor (FIG. 6B) into a magnetic flux ($\Phi_3$) forming the following closed loop: the edge portion 631 of the rotor 6→the stator magnetic pole 3→the yoke 26→the stator magnetic pole 4→the edge portion 642 of the rotor 6, and at the upper portion of the rotor (FIG. 6B) into a magnetic flux ($\Phi_4$) forming the following closed loop: the edge portions 631 and 632 of the rotor 6→the stator magnetic pole 3→the yoke 26→the stator magnetic pole 4→the edge portions 642 and 641 of the rotor 6. The detent torque is generated from the rotor 6 by these magnetic fluxes ($\phi_3$, $\phi_4$). As described above, the detent torque can be stably generated from the rotor 6 by the magnetic flux ($\phi_4$).

When the rotor 6 is at the rest position of FIGS. 6A and 6B, the excitation coil 21 is energized in a direction opposite to the above case so as to generate the N and S poles from the stator magnetic poles 3 and 4. Then, an attractive force F(3) is applied to the rotor 6 near the end faces 413 and 323 of the stator magnetic poles, and the rotor 6 is pivoted counterclockwise from the position shown in FIGS. 5B and 6B to the position shown in FIGS. 5A-5B. At the same time, the rotor 6 causes the output shaft 72 to generate the output torque.

At the lower portion of the rotor (FIG. 6B), the end faces 413 and 323 of the stator magnetic poles oppose the edge portions 632 and 641 of the rotor 6, thus obtaining a large activation torque.

As described above, according to the present invention, the rotary driving device can be provided wherein the gap positions of the opposing end faces of the stator magnetic pole pair are provided to be inclined in a circumferential direction, whereby the upper and lower portions of the rotor effectively and satisfactorily generate the output torque and the detent torque together.

Figure 7:
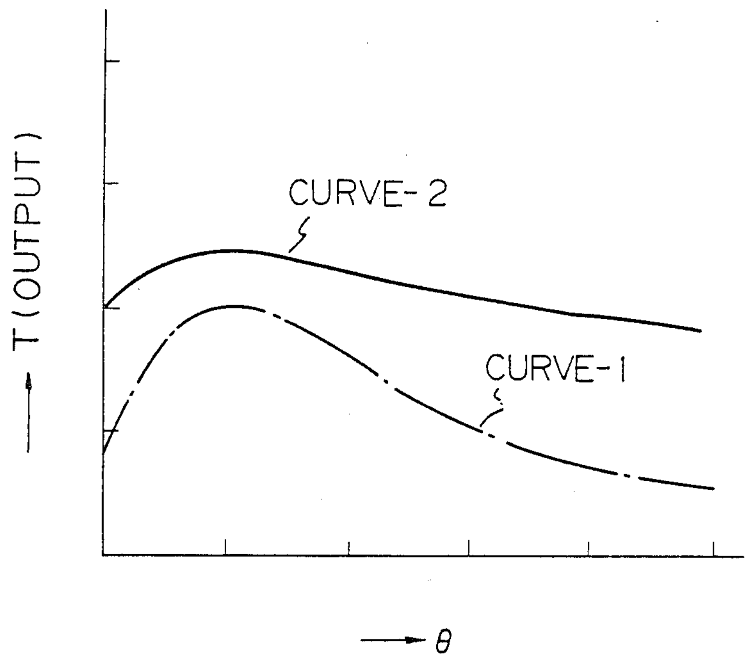

FIG. 7 shows characteristics of the output torque T(OUTPUT) with respect to the rotational angle $\theta$ of the rotor, and FIG. 8 shows characteristics of the output torque T(DETENT) with respect to the rotational angle $\theta$ of the rotor. Referring to FIGS. 7 and 8, a chain-line curve CURVE-1 represents the conventional device shown in FIGS. 1A and 1B, and a solid-line curve CURVE-2 represents the device according to this embodiment shown in FIGS. 2 and 3.

We claim:

1. A rotary driving device comprising:

a case defining an outer shape of the rotary driving device:

a pair of arcuate stator magnetic poles fixed inside said case and having end faces opposing through gaps;

a rotor of magnetic material rotatably supported inside said stator magnetic pole pair and having two arcuate pole surfaces disposed closely adjacent said stator poles and between two rotor planar surfaces parallel with the axis of rotation;

a rotary shaft for rotatably supporting said rotor; and an excitation coil for generating a magnetic force between said stator magnetic pole pair and said rotor pole surfaces, the circumferential positions of said gaps being so changed along the axial direction that a substantially constant rotational magnetic force is maintained between said stator poles and said rotor pole surfaces during rotation of said rotor, the width of said gaps being smaller than the distance between the two planar surfaces of said rotor.

2. A rotary driving device comprising:

a case defining an outer shape of the rotary driving device;

a pair of arcuate stator magnetic poles fixed inside said case and having end faces opposing through gaps;

a rotor of magnetic material rotatably supported inside said stator magnetic pole pair and having two arcuate pole surfaces disposed closely adjacent said stator poles and between two rotor planar surfaces parallel with the axis of rotation;

a rotary shaft for rotatably supporting said rotor;

an excitation coil for generating a magnetic force between said stator magnetic pole pair and said rotor pole surfaces; and stop surfaces on the inner surfaces of said stator magnetic poles against which said rotor abuts to restrict the rotary angle thereof;

the circumferential positions of said gaps being so changed along the axial direction that a substantially constant rotational magnetic force is maintained between said stator poles and said rotor pole surfaces during rotation of said rotor.

3. A rotary driving device comprising:

a case defining an outer shape of the rotary driving device;

a pair of arcuate stator magnetic poles fixed inside said case and having end faces opposing through gaps;

a rotor of magnetic material rotatably supported inside said stator magnetic pole pair and having two arcuate pole surfaces disposed closely adjacent said stator poles and between two rotor planar surfaces parallel with the axis of rotation;

a rotary shaft for rotatably supporting said rotor; and an excitation coil located at a position on the extension of the axis of rotation of said rotor for generating a magnetic force between said stator magnetic pole pair and said rotor pole surfaces;

the circumferential positions of said gaps being so changed along the axial direction that a substantially constant rotational magnetic force is maintained between said stator poles and said rotor pole surfaces during rotation of said rotor.

4. A rotary driving device comprising:

a case defining an outer shape of the rotary driving device;

a pair of arcuate stator magnetic poles fixed inside said case and having end faces opposing through gaps;

a rotor of magnetic material rotatably supported inside said stator magnetic pole pair and having two arcuate pole surfaces disposed closely adjacent said stator poles and between two rotor planar surfaces parallel with the axis of rotation;

a rotary shaft for rotatably supporting said rotor;

an excitation coil for generating a magnetic force between said stator magnetic pole pair and said rotor pole surfaces; and a valve body driven by said device to rotate about the axis of rotation of said rotor for changing the cross-sectional area of a path of fluid;

the circumferential positions of said gaps being so changed along the axial direction that a substantially constant rotational magnetic force is maintained between said stator poles and said rotor pole surfaces during rotation of said rotor.

5. A rotary driving device comprising:

a case defining an outer shape of the rotary driving device;

a rotor of magnetic material rotatably supported in said case and having at least one arcuate pole surface between two rotor planar surfaces parallel with the axis of rotation;

a shaft for rotatably supporting said rotor;

a pair of arcuate stator magnetic poles arranged outside said rotor, fixed inside said case, and having end faces opposing each other with a gap, said gaps being configured so that the position where an attractive magnetic force or repulsive magnetic force is generated between one of said stator magnetic poles and said pole surface of said rotor is changed according to the angular position of said rotor;

an excitation coil for generating a magnetic force between said stator magnetic pole pair and said rotor; and a rotor contact face on the inner side of at least one of said pair of stator magnetic poles for restricting the rotation of said rotor within a rotational angular range between first and second positions by the abutting of a surface of said rotor against said contact face.

6. A rotary driving device comprising:

a case defining an outer shape of the rotary driving device;

a pair of arcuate stator magnetic poles fixed inside said case and having end faces opposing through gaps;

a rotor of magnetic material rotatably supported inside said stator magnetic pole pair and having two arcuate pole surfaces disposed closely adjacent said stator poles and between two rotor planar surfaces parallel with the axis of rotation;

a rotary shaft for rotatably supporting said rotor; and an excitation coil for generating a magnetic force between said stator magnetic pole pair and said rotor pole surfaces, each of said gaps comprising a pair of circumferentially displaced straight portions and an inclined portion provided between said straight portions, and an edge portion of each of said pole surfaces of said rotor being arranged so as to oppose the portion of the stator magnetic pole positioned at said edge portion of each of said pole surfaces with a small gap therebetween when said rotor starts to rotate, the circumferential positions of said gaps being so changed along the axial direction that a substantially constant rotational magnetic force is maintained between said stator poles and said rotor pole surfaces during rotation of said rotor.

7. A device according to claim 2, wherein a nonmagnetic member is fixed to each of said contact surfaces.

8. A device according to claim 5, wherein the rotation of said rotor is such that, when said rotor is positioned at either said first position or said second position, a predetermined part of said pole surface is opposite to the inside of an end portion of a first magnetic pole of said stator magnetic pole pair, while the remainder part of said surface is adjacent to said end portion of said first magnetic pole of said stator magnetic pole pair.

* * * * *